US005221402A

United States Patent [19]

Westra et al.

[11] Patent Number: 5,221,402

[45] Date of Patent: Jun. 22, 1993

[54] FOLDING MACHINE SPRAYER AND FOLD PLATE AND METHOD OF USE THEREFORE

[75] Inventors: Michael A. Westra; Robin M. Tushek, both of Grand Haven, Mich.

[73] Assignee: The Challenge Machinery Company, Grand Haven, Mich.

[21] Appl. No.: 686,169

[22] Filed: Apr. 16, 1991

[51] Int. Cl.$^5$ .......... C09J 5/00; B31F 1/00

[52] U.S. Cl. .......... 156/314; 156/442.1; 156/442.2; 156/227; 118/32; 118/314; 118/326; 229/80; 493/420

[58] Field of Search .......... 156/441.5, 442.1, 442.2, 156/227; 229/80; 493/420; 118/314, 315, 326, 32

[56] References Cited

U.S. PATENT DOCUMENTS

| | | | |
|---|---|---|---|
| 1,125,926 | 1/1915 | Albrecht . | |
| 1,534,885 | 4/1925 | Trautman . | |
| 1,550,851 | 8/1925 | Trautman et al. . | |
| 1,577,271 | 3/1926 | Trautman . | |
| 1,594,868 | 8/1926 | Aldrich . | |
| 1,832,376 | 11/1931 | Frisch . | |
| 1,848,448 | 3/1932 | Weidner . | |
| 2,028,277 | 1/1936 | Finfrock . | |
| 2,963,002 | 12/1960 | Glaus | 118/326 X |
| 3,749,313 | 7/1973 | Weitmann | 118/315 X |
| 3,856,293 | 12/1974 | Boyer . | |
| 3,911,862 | 10/1975 | Lupkas . | |
| 3,995,849 | 12/1976 | Kistner . | |
| 4,104,983 | 8/1978 | Carstedt | 493/420 X |
| 4,518,380 | 5/1985 | Shimizu et al. . | |
| 4,551,188 | 11/1985 | Schulze . | |
| 4,586,704 | 5/1986 | Lehmann et al. . | |
| 4,701,233 | 10/1987 | Beck et al. . | |
| 4,759,946 | 7/1988 | Ribnitz | 118/326 X |
| 4,799,989 | 1/1989 | Marzullo . | |
| 4,850,300 | 7/1989 | Kraft et al. | 118/326 X |
| 4,875,965 | 10/1989 | Marzullo . | |
| 4,897,145 | 1/1990 | Marzullo . | |
| 4,900,391 | 2/1990 | Mandel et al. . | |
| 4,944,131 | 7/1990 | Gough . | |
| 4,951,864 | 8/1990 | Dicker | 229/80 |
| 5,046,710 | 9/1991 | Vijnk | 156/227 X |

FOREIGN PATENT DOCUMENTS

| | | |
|---|---|---|
| 555375 | 7/1932 | Fed. Rep. of Germany . |
| 560189 | 9/1932 | Fed. Rep. of Germany . |
| 1228278 | 11/1966 | Fed. Rep. of Germany . |
| 1240095 | 5/1967 | Fed. Rep. of Germany . |
| 3707479 | 9/1987 | Fed. Rep. of Germany . |
| 248383 | 7/1926 | United Kingdom . |
| 447017 | 5/1936 | United Kingdom . |
| 1094005 | 9/1965 | United Kingdom . |

OTHER PUBLICATIONS

Brochure, Vijnk Equipment, Inc. 1991.

Instruction and Parts Manual for Challenge SRA3 Table Model Folder.

*Primary Examiner*—David A. Simmons

*Assistant Examiner*—Mark A. Osele

*Attorney, Agent, or Firm*—Price, Heneveld, Cooper, DeWitt & Litton

[57] ABSTRACT

An apparatus for wetting adhesive portions on items such as mailers being folded by a folding machine is provided so that mailers can be folded, closed and sealed in one operation. The apparatus pumps fluid from a reservoir through tubes to fluid dispensers positioned so that adhesive portions of mailers pass thereby. A continuous stream of fluid dispensed by the fluid dispensers wets the adhesive portions on the mailers as they pass the fluid dispensers. The apparatus includes collection trays and suction means to collect excess fluid. A distribution manifold is used to distribute and control fluid dispersement.

Within one aspect of our invention a unique fold plate is provided comprising a frame with a plurality of elongated members removably attached to the frame for adjusting the positions thereof. The adjustment permits the fluid dispensers to be located at different positions on the fold plate so that items having adhesive portions in different locations can be wetted and folded on the folding machine. The adjustment also permits the elongated members to be adjusted away from the wet adhesive.

22 Claims, 4 Drawing Sheets

FOLDING MACHINE SPRAYER AND FOLD PLATE AND METHOD OF USE THEREFORE

BACKGROUND OF THE INVENTION

This invention relates to an apparatus for wetting adhesive on items being folded by a folding machine, and particularly to an apparatus allowing mailers to be folded, closed and sealed in one operation.

Folding machines are often used today to fold items such as mailers in high volume. This not only saves labor, but provides consistently folded items which are attractive in appearance. However, the folded items often must still be placed in envelopes and/or sealed for a variety of reasons such as for mailing or to hide confidential information. This secondary operation can be labor intensive and time consuming.

One way of solving these problems has been to automatically wet adhesive placed on the items and then sealingly press the items closed thereby forming finished product ready to be distributed. However, problems exist with present apparatus and methods of wetting the adhesive. The applicators typically use a wick-type applicator which tends to gum up. Further, present applicators require frequent maintenance such as constant manual refill, also present applicators are often not able to apply fluid reliably when processing items at high speeds. Further, the applicators are often difficult to reliably adjust, are bulky and are inflexible in use. This can result in difficult maintenance problems.

SUMMARY OF THE INVENTION

The present invention is directed to an apparatus for wetting adhesive on items being folded by a folding machine. The apparatus includes at least one fluid dispenser which receives fluid pumped from a reservoir through a supply tube means, the fluid dispenser positionable on the folding machine so that adhesive portions located on individual items pass adjacent the fluid dispenser and are wet by fluid deposited thereon. The apparatus further includes a means for returning excess fluid to the fluid reservoir.

In a further embodiment, suction means is used to urge the excess fluid supplied by the supply tube means back through the return lines to the fluid reservoir.

The present invention is further directed to laterally adjustable fold plate members which can be laterally adjusted to avoid the wet adhesive portions and also to allow lateral adjustment of the dispenser means.

The present invention is further directed to a method for wetting adhesive on mailers being folded by a folding machine, the method including the steps of pumping fluid through a fluid delivery system, applying the fluid to adhesive portions of items, and returning excess fluid to a fluid reservoir of the fluid delivery system.

With the above described components, a unique apparatus for wetting adhesive portions on items being folded by a folding machine is provided. Further, such apparatus is especially adapted for use with a folding machine such that mailers can be folded, closed and sealed in high volume.

BRIEF DESCRIPTION OF THE DRAWINGS

This invention and its function and operation will be further explained by the following description with reference to the drawings in which.

DETAILED DESCRIPTION OF THE PREFERRED EMBODIMENTS

Figure 1:
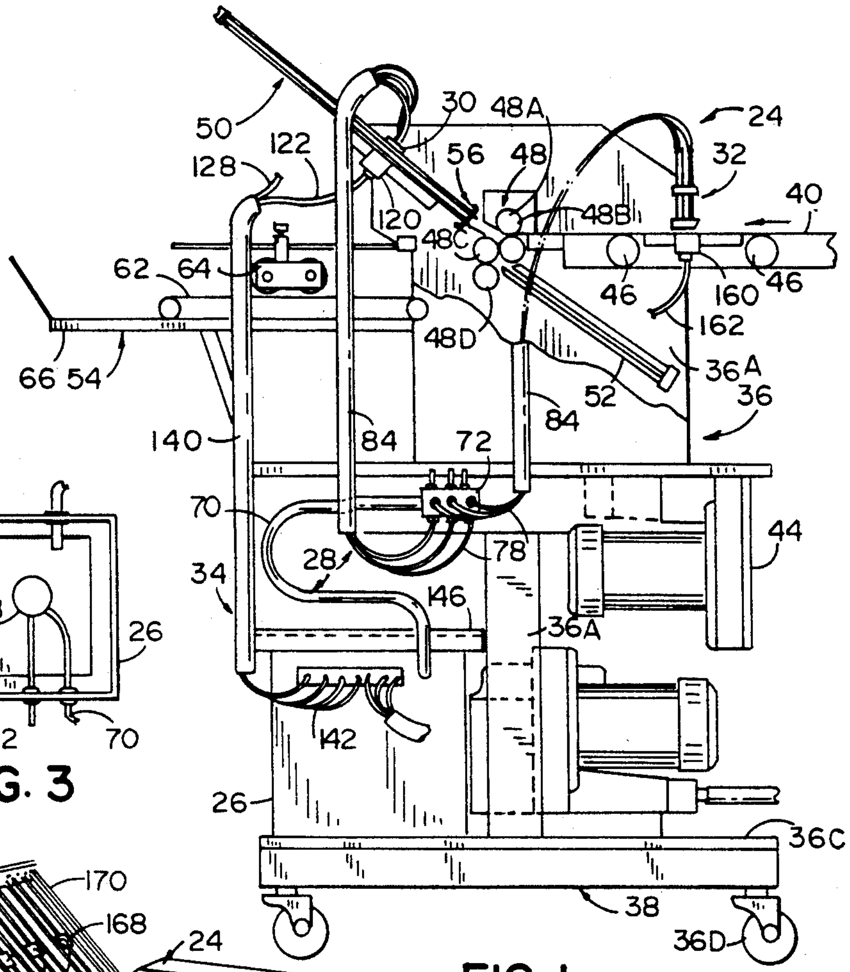
FIG. 1 is a partially broken away side view of a folding machine embodying the present invention.
Figure 2:
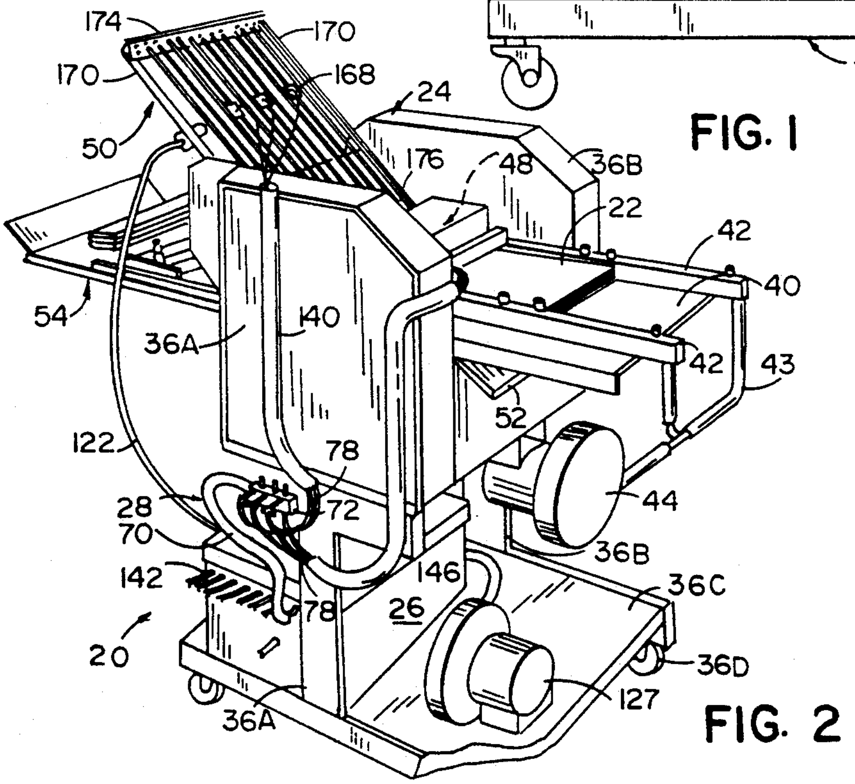
FIG. 2 is a perspective view of a folding machine embodying the present invention.

Referring initially to FIGS. 1 and 2, reference numeral 24 designates a folding machine for folding, wetting, closing and sealing items or mailers 22 in sequential steps by one operation. The folding machine 24 includes a frame 36 carried by a portable stand 38 and having upstanding sides 36A, 36B, bottom shelf 36C and casters 36D. Extending generally horizontally and laterally from machine frame 36 is a feed table 40 upon which a stack of mailers 22 is set ready to be individually and sequently fed into folding machine 24. It is also contemplated that feed table 40 could be aligned with and accept individual mailers 22 sequentially from a printer, copier or the like. Feed table 40 includes fences 42 which set on either side of the stack of mailers 22 and align mailers 22 on feed table 40. Compressor 44 blows air through air lines 43 into fences 42 and against the sides of the stack of mailers 22 to reduce the problem of mailers sticking together such as due to static electricity. Compressor 44 also draws a vacuum through vacuum lines (not shown) to assist a feed mechanism 46 in feeding mailers forward on feed table 40. Feed mechanism 46 individually and sequently selects mailers 22 and feeds them into folding machine 24.

The mailers 22 are fed by feed table 40 into an arrangement of rollers 48 which receive the individual mailers 22 and feed each mailer sequently into and out of first and second fold plates 50 and 52, respectively, and onto stacker tray 54. The arrangement of rollers 48 is well known in the art. In the illustrated embodiment, four rollers 48*a*, 48*b*, 48*c* and 48*d* are provided.

Fold plate 50 is designed to receive mailers 22 from rollers 48*a*, 48*b* through a throat portion 56 (FIG. 6) of fold plate 50 and partially into the body of first fold plate 50. The details of the body of fold plate 50 will be described later. Mailers 22 then translate into the central body area of fold plate 50 until they strike one or more adjustable stop plate stops which momentarily stop the linear movement of mailers 22. When this happens, mailers 22 buckle causing them to be drawn back between rollers 48*b* and 48*c*. As mailers 22 pass back between rollers 48*b* and 48*c* they are folded along a first fold line. Mailers 22 are then fed into a second fold plate 52 where they are momentarily stopped by a second set of adjustable plate stops which cause a second buckle. Mailers 22 are then drawn back between rollers 48*c* and 48*d* causing a second fold line to be formed. Mailers 22 are then fed onto stacker tray 54. An example of this type of folding apparatus is described in greater detail in U.S. Pat. No. 4,104,983 issued Aug. 8, 1978.

Stacker tray 54 (FIGS. 1 and 2) extends generally horizontally and laterally from machine frame 36 opposite feed table 40. Stacker tray 54 includes a conveyor belt 62 which carries mailers 22 away from rollers 48, and also includes heavy rollers 64 which roll on top of conveyor belt 62 and folded mailers 22. Heavy rollers 64 create a sufficiently heavy and sustained downward pressing force against mailers 22 and onto conveyor belt 62 to assure that mailers 22 are properly sealed as they exit folding machine 24. Conveyor belt 62 carries folded mailers 22 across stacker tray 54 and deposits mailers 22 onto a receiving tray 66. It is contemplated the present invention can be used on a variety of folding machines which are known in the art. However, the preferred embodiment is a folding machine 1 such as is illustrated in FIGS. 1 and 2 as described above.

Figure 4:
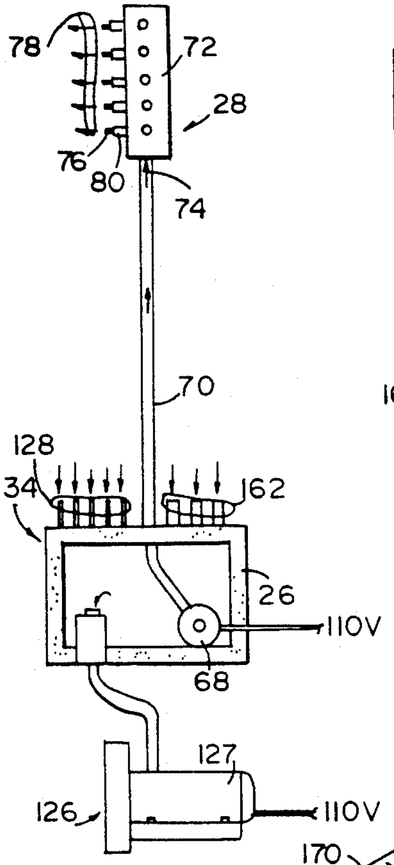
FIG. 4 is a schematic showing the fluid distribution system and also the fluid return system.
Figure 12:
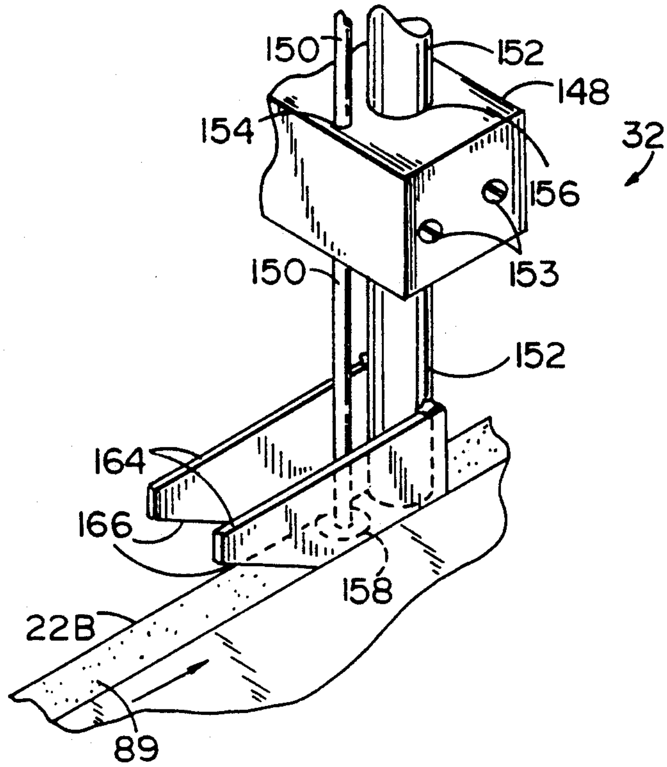
FIG. 12 is an enlarged perspective view of the second type fluid dispenser shown in FIG. 11.
Figure 14:
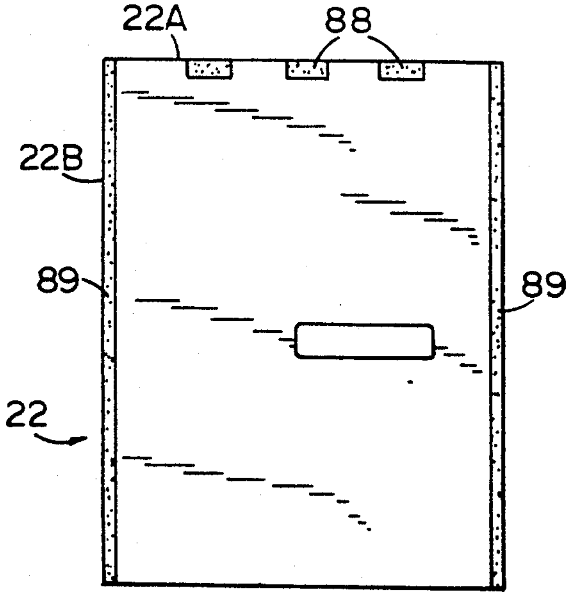
FIG. 14 is a plane view of an unfolded mailer disclosing the positions of the adhesive portions.
Figure 13:
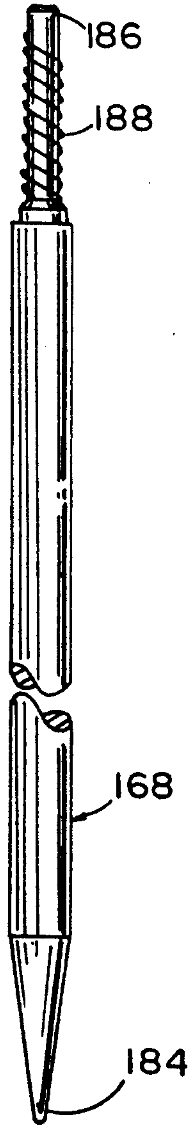
FIG. 13 is a partially broken away side view of a fold plate member.

One aspect of this invention is the wetting apparatus for wetting the adhesive portions of the mailers such as the portions 88 and 89 of the mailer 22 (FIG. 14). The wetting apparatus includes a pump 68 which pumps fluid from fluid reservoir 26 through a fluid distribution system 28 (FIG. 4) to fluid dispensers 30 and 32. A continuous stream of fluid through dispenser 30 wets a wetable adhesive portion 88 (FIG. 6) on mailers 22 as they pass fluid dispenser 30 while another continuous stream of fluid through dispenser 32 (FIG. 12) wets adhesive portion 89. The apparatus also includes a fluid return system 34 which collects excess fluid and returns it to reservoir 26.

Figure 3:
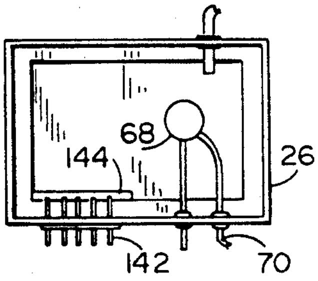
FIG. 3 is a top view of the fluid reservoir with the top removed.

The wetting apparatus (FIGS. 2–4) more specifically includes a reservoir 26 which cooperates with fluid distribution system 28 to supply water to fluid dispensers 30, 32 on folding machine 24. Fluid distribution system 28 includes a small submersible fluid pump 68 which pumps a supply of water from reservoir 26 through primary supply tube 70 to a manifold distribution block 72. In the preferred embodiment, primary supply tube 70 extends through the wall of reservoir 26 in an air tight manner such that air does not leak into reservoir 26 when a vacuum is drawn above reservoir 26 as will be discussed later.

Figure 5:
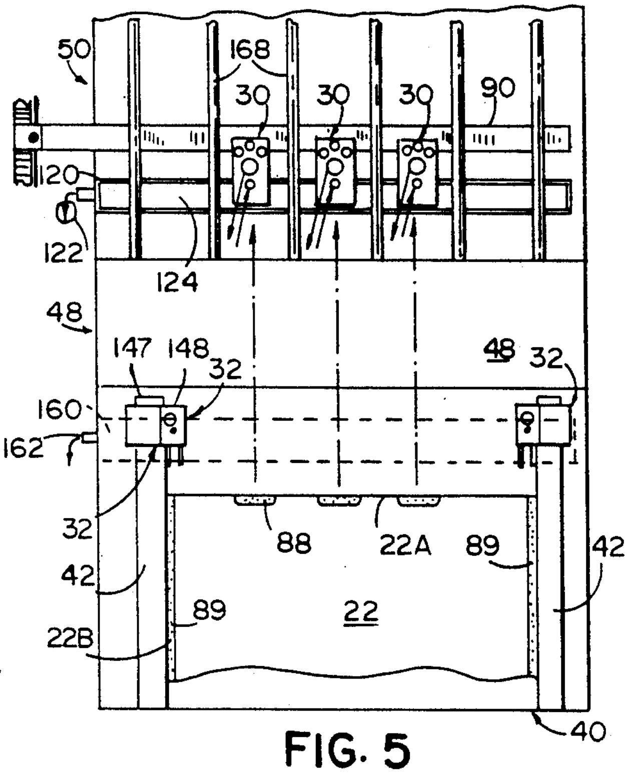
FIG. 5 is a top view of the folding machine showing the placement and orientation of the fluid dispensers, catch trays and fold plate members.

Distribution manifold block 72 (FIGS. 1 and 2) is mounted to a side of machine frame 36 so that manifold 72 is easily accessible. Manifold 72 (FIG. 4) includes a primary inlet 74 which connects to primary supply tube 70 and receives fluid being pumped from submersible pump 68 through primary supply tube 70. Manifold 72 includes multiple outlets 76 such that multiple secondary supply tubes 78 can be connected individually to outlets 76 and extend therefrom to various fluid dispensers 30, 32 located around folding machine 24. Each outlet 76 on manifold 72 further includes individual adjusters 80 (FIG. 5) which permit the volume of fluid delivered through each of secondary supply tubes 78 to be individually controlled. For convenience, a sheath or cover 84 (FIG. 1) can be used to group multiple secondary supply tubes 78 to improve tube management and increase aesthetics as tubes 78 are routed alternatively to first fold plate 50 and feed table 40 as shown.

Figure 6:
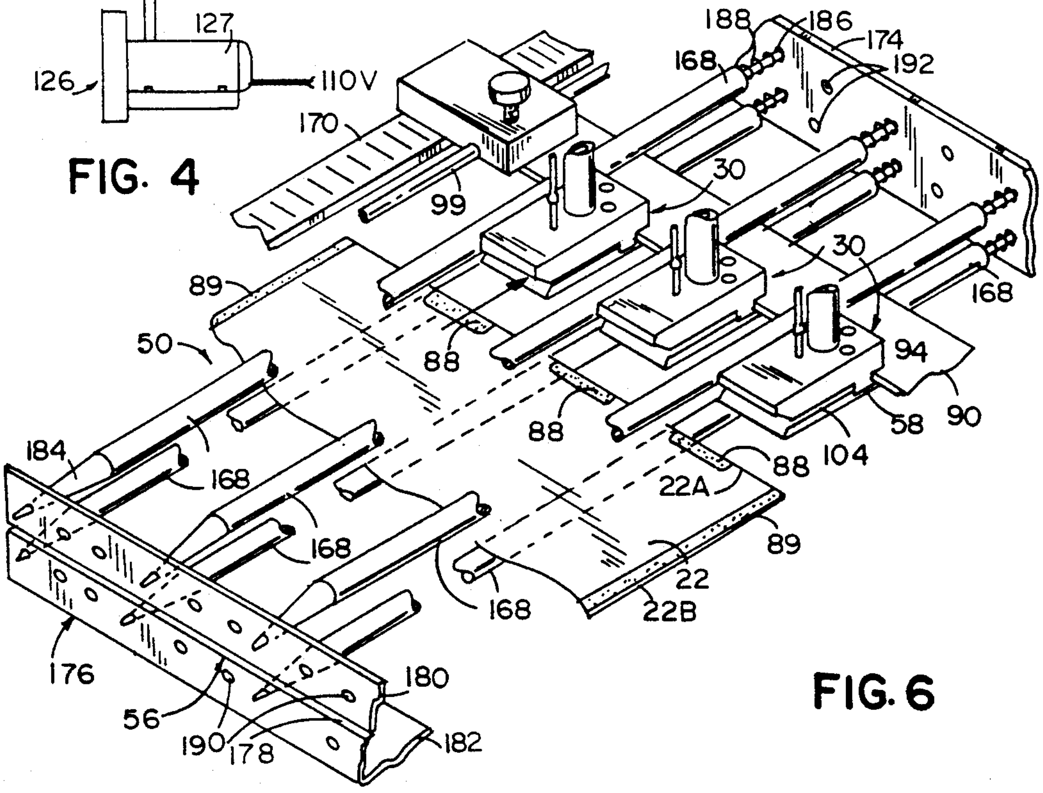
FIG. 6 is a perspective view of the fold plate with first type of fluid dispenser.

As best shown in FIGS. 6 and 14, mailers 22 include wetable adhesive portions 88 and 89 along one or more edges 22A, 22B. Before application of fluid, adhesive portions 88 and 89 are substantially dry and non-adhering. Adhesive portions 88 and 89 can be located substantially anywhere along an edge of mailer 22, but are generally located in at least two or more spots along a leading edge 22A and also along both side edges 22B. In the example shown, three adhesive portions or spots 88 are shown on front edge 22A of mailer 22 and continuous adhesive portions or strips 89 are shown along both side edges 22B.

Figure 7:
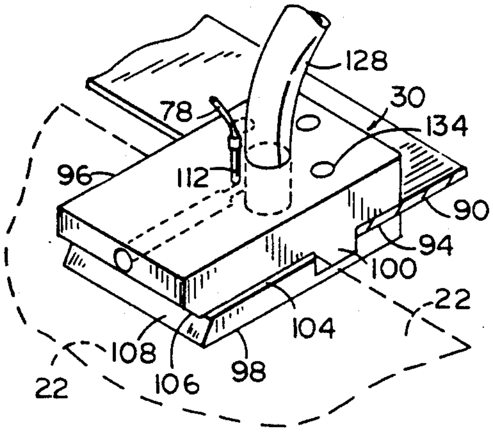
FIG. 7 is an enlarged perspective view of a fluid dispenser as shown in FIG. 6.
Figure 9:
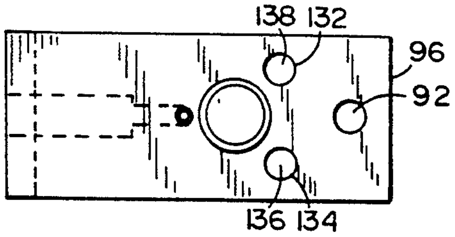
FIG. 9 is a top view of the fluid dispenser of FIG. 8.

A first type of fluid dispenser or tube holder 30 for wetting portions 88 (FIGS. 6–11) is positioned on fold plate 50 on a lateral support 90. Lateral support 90 extends from side to side on fold plate 50 and is linearly longitudinally adjustable parallel to the path of travel of mailers 22. Fluid dispenser 30 includes a slot 94 (FIGS. 6 and 7) such that fluid dispenser 30 can be slipped onto lateral support 90 and laterally adjustably positioned from side to side thereon. A set screw 92 (FIGS. 7 and 8) which threads into dispenser 30 and transversely into slot 94 clamps against support 90 thereby holding dispenser 30 in place on support 90.

Fluid dispenser 30 (FIGS. 6–10) is comprised of an upper half 96 and a lower half 98 connected together by screws 136, 138 extending through holes 132, 134. Upper half 96 includes a downwardly extending standoff 100 which fits into a notch 102 in lower half 98. Standoff 100 is slightly greater in height than notch 102 is in depth such that assembly of upper half 96 to lower half 98 causes the rearwardly facing slot 94 to be formed which can be used to receive support 90. Assembly of halves 96, 98 also causes a forwardly facing slot 104 to be formed. Slot 104 is shaped and located so that standoff 100 acts as a stop plate surface 58 for mailers 22. During the folding process, mailers 22 slip within fold plate 50 and specifically slot 104, and are momentarily stopped as they strike standoff 100. This causes mailers 22 to buckle and to be drawn back into the arrangement of rollers 48.

Adjacent the front edge of slot 104 are tapered edges 106 and 108 (FIG. 7) which form a guide for directing mailers 22 into slot 104 and against standoff or stop 100. As noted in FIG. 6, support 90 is adjustable forwardly and rearwardly on the rod 99 of first fold plate 50 longitudinally parallel to the line of travel of mailers 22 as they enter and exit from first fold plate 50. By adjusting support 90 fore and aft, the stop plate surface 58 of standoffs 100 of fluid dispensers 30 are adjusted fore and aft thereby permitting adjustment of where the buckle occurs in mailers 22.

Figure 8:
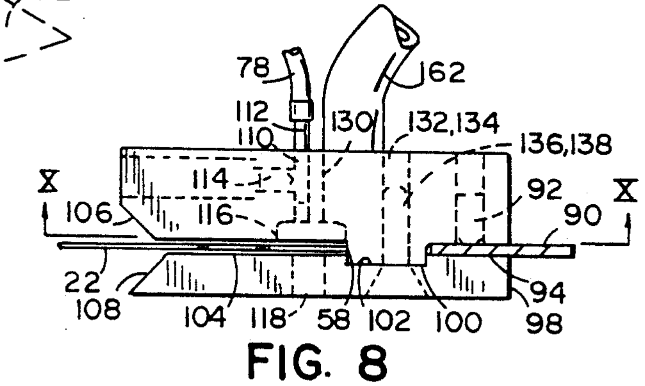
FIG. 8 is a side view of the fluid dispenser of FIG. 7.
Figure 10:
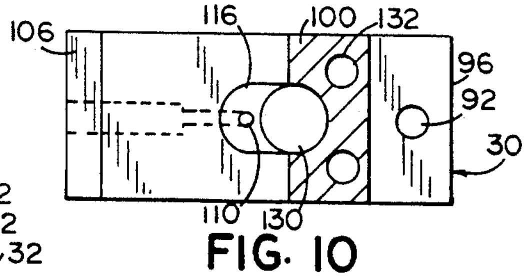
FIG. 10 is a cross-sectional view taken through lines X—X in FIG. 8.
Figure 11:
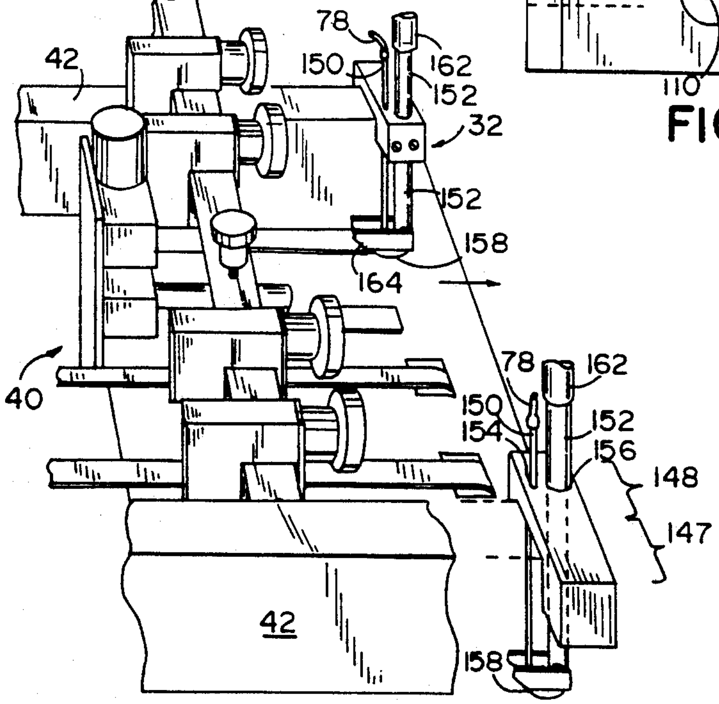
FIG. 11 is a perspective, partial view of the feed table with a second type of fluid dispenser located thereon.

Fluid dispenser 30 further includes one or more fluid supply holes 110 extending though upper half 96 and transversely into slot 104, hole 110 receiving a nipple 112 which is held in place by set screw 114. Secondary supply tube 78 is matingly installed onto nipple 112 and thereby provides a supply of fluid to fluid dispenser 30. Adjacent the lower end of supply hole 110 and adjacently above slot 104 is an enlarged pocket 116 (FIGS. 8 and 10). Pocket 116 permits fluid to spread somewhat as it flows downwardly strikingly onto forward edge 22A of mailers 22.

Lower half 98 includes a drain hole or aperture 118 positioned immediately below fluid supply hole 110 which allows water to pass directly downwardly through supply hole 110 into drain hole 118 when mailer 22 is not present within slot 104. Drain hole 118 allows fluid to drain into a catch tray 120 (FIG. 5) which catches excess fluid dropped by secondary supply tube 78 and dispenser 30, and recycles the fluid back through drain or return tube 122. A porous fibrous material 124 is placed within catch tray 120 to reduce splash and splatter from the fluid dropped by secondary supply tube 78 and dispenser 30. Material 124 can be made of any material, but is contemplated to be a porous fibrous material such as a scouring pad or sponge like fibrous material.

The preferred embodiment also includes a suction means or vacuum assist system which is operably connected to fluid dispensers 30, 32 and catch trays 120, 160. Suction means is comprised of a suction or vacuum pump 127 (FIGS. 1–4) which draws a vacuum within reservoir 26 and interconnecting suction tubes 128 to urge excess fluid back to reservoir 26. Relative to fluid dispenser 32 (FIGS. 7 and 8) the suction means includes a suction or drain line 128 which is mateably received and held within a suction hole 130 in upper half 96 of fluid dispenser 30. Suction hole 130 is located adjacent fluid supply hole 110 and connects with enlarged pocket 116. Suction tube 128 is of sufficient size such that an adequate flow of suction air passes through suction tube 128 to suck excess fluid from fluid dispenser 30. The primary function of suction tube 128 is to draw excess fluid away from dispenser 30 when mailer 22 pierces the stream of fluid dropped through fluid supply hole 110 (as mailer 22 enters slot 104). During this brief moment, mailer 22 substantially blocks off drain hole 118. Thus, without the sucking action by suction tube 128, a somewhat uncontrolled flooding of the area would result which may be undesirable.

Suction tubes 128 (FIGS. 1–4) extend from fluid dispensers 30 downwardly and back to reservoir 26. Suction tubes 128 may be covered in a sheath or cover 140 to group the suction tubes to facilitate tube management and also add to the aesthetics of machine 24. Suction tubes 128 attach to nipples or connectors 142 located in the side of reservoir 26. Nipples 142 are mounted substantially air tight within reservoir 26, thus permitting a vacuum to be drawn over reservoir 26 as discussed below. Anti-splash material 144 (FIG. 3) mounted to the inside of reservoir 26 adjacent nipples 142 prevents fluid from returning to reservoir 26 and splattering in an uncontrolled manner. Anti-splash material 144 can be of a fibrous porous material similar to material 124 in catch tray 86.

In the preferred embodiment, suction is created by creating a vacuum in reservoir 26. The vacuum may be created by a number of means such as by covering reservoir 26 with a substantially air tight cover 146 and drawing air away from the covered reservoir. The amount of suction and size of suction tubes 128 which must be used varies depending upon the amount of fluid deposited by fluid dispensers 30, 32. This in turn varies depending upon the speed of folding machine 24. With the use of suction means 26, apparatus 20 is particularly adapted for high speed folding machines.

Secondary supply tubes 78 also extend to a second type of fluid dispenser 32 (FIGS. 5, 11 and 12) which are positioned on feed table 40. Dispensers 32 are comprised of an attachment end 147 which attaches to fence 42 and a manifold end 148 which houses a fluid supply nipple 150 and a drain or return nipple 152. Supply nipple 150 and return nipple 152 are vertically adjustable by set screws 153 located within holes 154 and 156 so that proper clearance can be set for mailers 22 under dispensers 32 and between dispensers 32 and feed table 40. Nipples 150 and 152 extend through manifold 148 upwardly a distance so that secondary supply tubes 78 and suction or drain tubes 162 can be properly slipped over and attached to nipples 150 and 152. Fluid supply nipple 150 extends downwardly a distance below manifold 148 but slightly short of the upper surface of feed table 40 such that mailers 22 can slideably pass thereunder. Manifold 148 is typically mounted to and adjacent fence 42 such that edge 22B of mailers 22 passes under nipple 150 (and 152), though it is contemplated that manifold 148 could be located substantially anywhere. In the position adjacent fence 42, fluid is dispensed onto an edge 22B of mailers 22 as mailer 22 passes under the stream of fluid dropped by supply nipple 150. At the same time, excess fluid is sucked up and drawn away by drain return nipple 152 into suction tube 128 and back to reservoir 26.

A drain hole or aperture 158 is located directly below fluid supply nipple 150 and during the time when a mailer 22 is not present under nipples 150, fluid supply nipple 150 drops an uninterrupted steady stream of fluid into a drain hole 158 located in feed table 40. A catch tray 160 is positioned under drain hole 158 and connects to a drain tube 162 which returns excess fluid to reservoir 26. In the preferred embodiment, return nipple 152 is located downstream of supply nipple 150 such that excess water tends to be carried toward return nipple 152 as mailer 22 is fed forwardly. Additionally, splash shields 164 are attached to either side of return nipple 152 and extend toward the oncoming mailers 22 and on either side of supply nipple 150. Splash shields 164 include a downwardly tapered portion 166 which tends to direct mailers 22 downwardly under nipples 150 and 152 and prevent mailers 22 from crumpling and jamming in front of nipples 150 and 152. Splash shields 164 also tend to contain the fluid as it strikes and spreads on mailers 22.

Another aspect of this invention is the uniquely constructed fold plate 50 which provides for the adjustment of the positions of the fluid dispensers 30 on the fold plate to accommodate wetting of mailers having differently placed adhesive portions. Fold plate 50 (FIGS. 2 and 6) has a picture-frame like shape and includes two sides 170, a top end 174 and a bottom end 176. An elongated opening or throat 178 (FIG. 6) is formed in bottom end 176 by an upper member 180 and a lower member 182 such that mailers 22 can translate or slide linearly through opening 178 of bottom end 176 and into fold plate 50. Pairs of fold plate members 168 are longitudinally oriented within fold plate 50 parallel to the path of mailers 22 such that as mailers 22 are directed through elongated opening 178, they are further directed within fold plate 50 and into slot 104 in tube holders 30. As noted previously, mailers 22 are forced into slot 104 of fluid dispensers 30 such that the fluid dispensers 30 act as fold plate stops causing mailers 22 to buckle. Due to the interaction of fold plate members, rollers 48, and throat opening 178, the buckle forms predictably adjacent the arrangement of rollers 48 and not within the fold plate.

As noted fold plate 50 further includes a set of unique fold plate rods or members 168 which are easily and quickly adjustable. By being adjustable, fold plate members 168 can be adjusted away from adhesive spots 22A on mailers 22 and also can be moved out of the way of fluid dispensers 30, thereby allowing dispensers 30 to be moved into position to wet adhesive portions 22A.

The plurality of fold plate members 168 are generally rod-like in shape and extend slightly longer in length then the distance from bottom end 176 to top end 174. Members 168 include a tapered or pointed end 184 and a peg-like end 186 which includes a bias means such as a coil spring 188. Opportunely, upper and lower members 180, 182 include a series of apertures or holes 190 substantially uniformly spaced in a line extending from one side of upper member 180 to the other side. Holes 190 are sized to matingly engage end 184 of fold plate member 168. Also opportunely, top end 174 includes a similar set of pairs of holes or apertures 192 which correspond to holes 190, but which are of a larger diameter corresponding to peg-like end 186 of fold plate members 168.

The peg-like end 186 of fold plate members 168 is mateably placed into holes 192 thereby compressing spring 188 somewhat. This allows pointed end 184 to be installed within holes 190. Member 168 is then released allowing bias spring 188 to expand and push pointed end 184 against hole 190. In this position, peg-like end 188 continues to be held by one of holes 192 due to the length of end 188 and of member 168. In this way, multiple fold plate members 168 can be removably installed in pairs between top end 174 and bottom end 176 thereby forming a guide means which directs mailers 22 upwardly into slot 104 of tube holders 30. This guide means provides support for mailers 22 so that mailers 22 tend to buckle near to rollers 48 as they strike standoff 100 (as is desired) and not to buckle within fold plate 50. By gripping fold plate members 168 and compressing coil spring 188, fold plate members 168 can be easily adjusted from one position to another. This is particularly useful where fold plate members 168 must laterally be adjusted from one location to another so that adhesive spots 22A can be avoided, thus avoiding accumulation of wet adhesive gum on fold plate members 168. This is also particularly useful so that members 168 can be moved out of the way to provide clearance for proper adjustment of fluid dispensers 30. This adjustment is often required where various mailers 22 need to be folded, closed and sealed, but adhesive spots 88 are not consistently located from one stack of mailers 22 to the next.

OPERATION

Having described our invention the method of use and the operation thereof should become evident to one skilled in the art. Briefly, the operation begins with an assembled folding machine 1 having the wetting apparatus which includes the fluid reservoir 26, the fluid distribution system 28 and the fluid return system 34 all as previously described along with the unique fold plate 50. Fluid is added to reservoir 26, and pump 68 is turned on such that fluid is conveyed from reservoir 26 through supply tube 70 to distribution manifold 72. An operator adjusts individual controls 80 such that the desire amount of fluid passes out individual secondary supply tubes 78 to fluid dispensers 30, 32. A steady stream of fluid is dropped downwardly through fluid dispensers 30, 32 into apertures 118 and aperture 158 into catch trays 120 and 160. Fluid is then funneled from catch tray 120 and 160 back through drain or return tubes 82 and 122 to fluid reservoir 26. A fibrous porous material 124 is placed within catch tray 120, 160 to minimize splashing of the fluid. Suction means 126 is turned on so that drain tubes 82, 122 begin the sucking action which urges excess fluid back to reservoir 26.

Mailers 22 are then placed on feed table 40 and readied to be folded. Also, fluid dispensers 30 are longitudinally adjusted on fold plate 50 to accommodate the size of the mailers such that mailers 22 will be stopped in an appropriate location so that buckles in mailers 22 form as desired and mailers 22 are folded in the desired fold line. Further, fluid dispensers 30 are adjusted laterally to accommodate the placement of the adhesive portions 88 such that the stream of fluid dispensed by the fluid dispensers 30 aligns generally with the adhesive portions 88 on mailers 22. Correspondingly, fold plate members 168 are positioned laterally to provide clearance for fluid dispensers 30 while at the same time providing adequate support for mailers 22 as they translate through elongated throat opening 178 in fold plate 50. It should be noted that fluid dispensers 32 which are mounted on fences 42 are automatically aligned adjacent with a edge of mailer 22 when fence 42 is moved laterally against a side of the stack of mailers 22 setting on feed table 40.

The operator also adjusts the folding machine as is required by normal operation of folding machine 1.

Folding machine 1 is then turned on and mailers 22 are individually and sequentially fed forward on feed table 40. As mailers 22 progress forwardly, the lateral edges of mailers 22 and specifically lateral adhesive portions 89 on edges 22B pass underneath fluid dispenser 32. Adhesive portion 89 pierces the stream of fluid being dropped by fluid dispenser 32 and specifically fluid supply nipple 150. As fluid spreads on adhesive portion 89, the fluid is carried forward and under suction tube 128 which removes excess fluid from edge 22B and draws the excess fluid back to reservoir 26. Simultaneously, splash shields 164 cooperate with this arrangement to direct mailers 22 downwardly under tapered inlet portion 166 and also to contain the fluid such that the fluid does not spread laterally farther than desired. Splash shields 164 tend to contain the excess fluid and to prevent it from spreading farther than return nipple 152 and suction tube 128 are able to suction the excess fluid away.

Individual mailers 22 are fed between rollers 48*a* and 48*b* and then into fold plate 50 through elongated throat opening 178 and between fold plate members 168 into slot 104 of fluid dispenser 30 striking standoff 100. Due to the support from fold plate members 168 located above and below mailers 22, mailers 22 buckle near to the arrangement of rollers 48 causing mailers 22 to be drawn backwardly between rollers 48*b* and 48*c* thereby folding mailers 22 along a fold line. As mailers 22 enter slot 104, adhesive portions 88 on edge 22A pierce the stream of fluid being dropped within fluid dispenser 30 and specifically by fluid supply nipple 112. Thus, the flow of fluid through nipple 112 downwardly into drain hole 118 is interrupted. As excess fluid splashes and spreads on adhesive portion 88 of mailer 22 and within enlarged pocket 116, excess fluid begins to be sucked into suction tube 128 which carries the excess fluid away toward fluid reservoir 26. Excess fluid also can build up somewhat and run downwardly by gravity into catch tray 120 where it is caught and returned through return tube 122 back to reservoir 26.

Mailer 22 is then carried away from fluid dispenser 30 and outwardly through elongated throat opening 178. As mailer 22 is carried between rollers 48*b* and 48*c* to the fold plate 52, mailer 22 is folded on the first buckle thereby forming a fold line and causing adjacent parts of mailer 22 to be pressed against each other. This allows the wetted adhesive portions 88 and 89 on edges 22A and 22B to adhere to corresponding parts of mailer 22. Additionally, it should be noted that excess fluid also flows directly from nipple 112 to drain hole 118 to catch tray 120 when mailer 22 is not present within slot 104.

As the mailer is forced by rollers 48*b* and 48*c* to fold plate 52, the mailer strikes a stop (not shown) causing the mailer to buckle forming a second fold line after which the mailer is forced by rollers 48*c* and 48*d* onto stacker conveyer belt 62 and underneath heavy rollers 64. The action of heavy rollers 64 compressing folded mailers 22 on stacker tray conveyer belt 62 and specifically stacker tray 54 causes mailers 22 to sealingly adhere in a closed and folded position. This provides the means for securing the adhesive portions together. Mailers 22 are then collected on receiving tray 66 and are ready for distribution.

MODIFICATION

In less expensive models which are not as speedy the invention is modified by leaving off the suction means. In this modification, the fluid is returned by gravity through a system of catch trays and return tubes to a fluid reservoir. This simplifies apparatus 20 somewhat, but also can affect the operating speed at which the folding machine is capable of operating and also the frequency of maintenance required.

It should be evident from the above description that we have provided an apparatus for wetting adhesive on items for use with a folding machine which is specifically adapted for high volume folding, closing and sealing of mailers. This is made possible by the unique fluid supply and also fluid return systems of this invention which include tube holders and associated parts and interconnections as described.

It should also be evident that we have provided apparatus which can be easily adjusted for accommodating differently sized mailers with a variety of adhesive placements.

Having described our invention, it should be understood that although a preferred embodiment has been disclosed herein, other modifications and embodiments can be utilized without departing from the spirit and scope of this invention. Therefore, this invention should not be limited to only the embodiment illustrated which has been described as an example only.

The embodiments of the invention in which an exclusive property or privilege is claimed are defined as follows:

1. A method for wetting adhesive portions of items being folded by a folding machine comprising the steps of:

providing a steady stream of fluid from a fluid source;

periodically delivering said items to be folded to said steady stream of fluid so as to expose said adhesive portions of said items to said stream of fluid;

returning the excess of fluid from said stream to said fluid source; and suctioning excess fluid back to said fluid reservoir, said excess fluid being suctioned both from a catch tray positioned to collect excess fluid and also from said fluid dispenser.

2. A fluid dispenser for use on a folding machine to dispense fluid so as to activate adhesive on sheet items being folded on the folding machine, comprising: a block manifold including an upper half and a lower half, said upper and lower halves being securely interconnected and defining a slot therebetween with an open end adapted to periodically receive an adhesively coated edge of a sheet item to be folded, said upper half including a first hole for supplying a steady stream of fluid to the slot for wetting the adhesively coated edge when present in the slot, said lower half including a second hole aligned with the first hole for carrying the steady stream of fluid away from said slot when no adhesively coated edge is present in the slot, said upper half further including a second hole for removing by vacuum excess fluid spread onto the adhesively coated edge and spread around in said slot when the adhesively coated edge interrupts the steady stream of fluid; and means for adjustably retaining said block manifold on a folding machine so that the block manifold can be adjusted to a position aligned with the adhesive coated edge of the sheet item.

3. A fluid dispenser as defined in claim 2 wherein said means for adjustably retaining includes a second slot for adjustably engaging a web on the folding machine, and further includes a set screw for frictionally engaging the web to retain the web in the second slot.

4. An apparatus for folding items and for wetting predetermined adhesive portions of said items being folded by a folding machine; said folding machine including means for folding and means for securing said predetermined adhesive portions of said items together;

a feed table adapted to sequentially individually feed said items into said means for folding;

an arrangement of rollers aligned to accept said items from said feed table and orient said items into a fold plate;

at least one fold plate aligned to accept said items from said arrangement of rollers, said fold plate including an adjustable plate stop which stops said items causing said items to buckle and be fed back into said arrangement of rollers thereby folding said items on a fold line;

said arrangement of rollers further adapted to convey said folded mailers onto a stacker tray;

a stacker tray for receiving folder mailers;

the apparatus for wetting comprising:

a fluid reservoir;

pump means for pumping fluid from said reservoir;

fluid dispenser means positionable on said folding machine so that said adhesive portions of each individual item pass adjacent said fluid dispenser means, said dispenser means adapted to deposit fluid on said adhesive portions, said dispenser means positionable on said fold plate and adapted to act as a fold plate stop for stopping said items and causing said items to buckle, said dispenser means being longitudinally adjustable parallel to the path of said items thus allowing adjustment of the location of said fold line on said items;

supply tube means operably connected between said pump means and said dispenser means, said supply tube means adapted to conduct fluid from said fluid reservoir to said dispenser means; and means for returning excess fluid to said fluid reservoir.

5. The apparatus as defined in claim 4 wherein at least one dispenser means includes first and second spaced members which form a laterally extending inlet slot oriented to receive said adhesive portions of said items, and said dispenser means further includes a transverse hole for communicating with said supply tube means, said transverse hole located in said first member and extending at an angle to said inlet slot.

6. The apparatus as defined in claim 5 including a drain hole located in said second spaced member and aligned with said transverse hole, said drain hole cooperating with said means for returning fluid to return fluid from said dispenser means back to said fluid reservoir.

7. The apparatus as defined in claim 6 wherein said means for returning fluid includes a suction means communicating with said drain hole.

8. The apparatus as defined in claim 7 wherein said suction means includes a suction pump and return tube means for conveying fluid from said dispenser means back to said fluid reservoir.

9. The apparatus as defined in claim 8 wherein said first spaced member further includes a suction hole for communication with said return tube means, said suction hole being positioned adjacent said transverse hole and positioned to allow suction of excess fluid which is deposited by said dispenser means onto said adhesive portion of said items.

10. An apparatus for folding items and for wetting predetermined adhesive portions of said items being folded by a folding machine; said folding machine including means for folding and means for securing said predetermined adhesive portions of said items together, said folding machine also including a feed table adapted to hold a stack of unfolded items and to individually sequentially feed said items into said means for folding;

the improvement in said apparatus for wetting said adhesive portions on said items comprising:

a fluid reservoir;

pump means for pumping fluid from said reservoir;

fluid dispenser means positionable on said folding machine so that said adhesive portions of each individual item pass adjacent said fluid dispenser means, said dispenser means being adapted to deposit fluid on said adhesive portions, at least one of said fluid dispensers being positioned on said feed table;

supply tube means operably connected between said pump means and said dispenser means, said supply tube means adapted to conduct fluid from said fluid reservoir to said dispenser means; and means for returning excess fluid to said fluid reservoir, said means for returning excess fluid including at least one drain hole located in said feed table, said fluid dispenser being positionable over said drain hole in said feed table and adjacent an edge of the path of said items entering said means for folding.

11. The apparatus as defined in claim 10 wherein said dispenser means is laterally adjustable transverse to said path of said items.

12. The apparatus as defined in claim 10 wherein splash guards are provided on either side of said dispenser means to reduce the tendency of excess fluid to splash as said items pass adjacent said dispenser means.

13. The apparatus as defined in claim 10 wherein a catch tray is positioned under said drain hole to catch excess fluid deposited by said dispenser means.

14. An apparatus for folding items and for wetting predetermined adhesive portions of said items being folded by a folding machine; said folding machine including means for folding and means for securing said predetermined adhesive portions of said items together, said folding machine further including a feed table adapted to individually sequentially feed said items into said means for folding, an arrangement of rollers aligned to accept items from said feed table and orient said items into a fold plate, and at least one fold plate aligned to accept said items from said arrangement of rollers, said fold plate including an adjustable plate stop which stops said items causing said items to buckle and be fed back into said arrangement of rollers thereby selectively folding said items on a fold line;

the improvement in said apparatus for wetting said adhesive portions on said items comprising:

a fluid reservoir;

pump means for pumping fluid from said reservoir;

fluid dispenser means positionable on said folding machine so that said adhesive portions of each individual item pass adjacent said fluid dispenser means, said dispenser means adapted to deposit fluid on said adhesive portions;

supply tube means operably connected between said pump means and said dispenser means, said supply tube means adapted to conduct fluid from said fluid reservoir to said dispenser means; and means for returning excess fluid to said fluid reservoir;

said fold plate including:

a fold plate frame having a picture-frame shape with two sides, a top and bottom, said bottom including an upper and lower throat member defining an elongated opening sufficiently large to receive said items, a plurality of fold plate members extending between said top and said upper throat member of said bottom and also between said top and said lower throat member of said bottom thereby defining a path for said individual items as said items enter said fold plate, and means for laterally adjustably retaining said plurality of fold plate members so that said fold plate members are adjustable transverse to said path for said items.

15. The apparatus as defined in claim 14 wherein said fold plate members are removable.

16. The apparatus as defined in claim 15 wherein said fold plate members are moveable between an extended position for use and a retracted position permitting removal, and said fold plate members further include a bias means biasing said fold plate members to an extended use position, said bias means cooperating with said means for laterally adjustably retaining said plurality of fold plate members to securely hold said fold plate members in said use position.

17. The apparatus as defined in claim 16 wherein said top and bottom of said fold plate frame include multiple apertures, and said fold plate members include ends which releasably engage said multiple apertures.

18. The apparatus as defined in claim 17 wherein at least one end of said fold plate members is pointed.

19. A fold plate for a folding machine, said fold plate comprising:

a fold plate frame having a picture-frame shape with two sides, a top and bottom, said bottom including an upper and lower throat member defining an elongated opening sufficiently large to receive said items to be folded;

a plurality of elongated fold plate members extending between said top and said upper throat member of said bottom and also between said top and said lower throat member of said bottom thereby defining a path for said individual items as said items enter said fold plate; and means for laterally adjustably retaining said plurality of fold plate members.

20. The fold plate as defined in claim 19 wherein said fold plate members are moveable between an extended use position in which said fold plate members are securely held and a retracted position which permits said fold plate members to be moved, and said fold plate members further include a bias means which biases said fold plate members to said extended use position, said bias means cooperating with said means for laterally adjustably retaining said fold plate members to securely and adjustably retain said fold plate members in said use position.

21. The fold plate as defined in claim 20 wherein said top and bottom of said fold plate frame include multiple apertures, and said fold plate members include ends which releasably engage said multiple apertures.

22. The fold plate as defined in claim 21 wherein at least one end of said fold plate members are pointed.

* * * * *